(12) United States Patent
Muller et al.

(10) Patent No.: US 7,059,454 B2
(45) Date of Patent: Jun. 13, 2006

(54) ONE-WAY BRAKING DEVICE

(75) Inventors: Hans-Gunther Muller, Wurzburg (DE); Steffen Breunig, Tauberrettersheim (DE); Manfred Vorbach, Creglingen (DE)

(73) Assignee: ITW Automotive Products GmbH Co. KG, Iserlohn (DE)

( * ) Notice: Subject to any disclaimer, the term of this patent is extended or adjusted under 35 U.S.C. 154(b) by 0 days.

(21) Appl. No.: 11/030,198

(22) Filed: Jan. 7, 2005

(65) Prior Publication Data

US 2005/0115784 A1 Jun. 2, 2005

Related U.S. Application Data

(63) Continuation of application No. 10/383,610, filed on Mar. 10, 2003, now abandoned.

(30) Foreign Application Priority Data

Mar. 13, 2002 (DE) ................................. 102 10 917

(51) Int. Cl.
*F16D 63/00* (2006.01)
*E05F 3/04* (2006.01)

(52) U.S. Cl. ..................... 188/82.1; 188/294; 188/302; 16/51

(58) Field of Classification Search ........ 188/290–296, 188/293, 302, 303, 322.5, 82.1–82.9; 16/49, 16/51, 58, 62
See application file for complete search history.

(56) References Cited

U.S. PATENT DOCUMENTS

| 4,415,069 | A | 11/1983 | Eisemann |
| 4,697,673 | A | 10/1987 | Omata |
| 4,796,733 | A | 1/1989 | Nakayama |
| 4,872,239 | A | 10/1989 | Ferguson et al. |
| 5,090,521 | A | 2/1992 | Miura |
| 6,666,306 | B1 | 12/2003 | Gasser |
| 2002/0096405 | A1 | 7/2002 | Gasser |

FOREIGN PATENT DOCUMENTS

| DE | 31 26 841 | 2/1983 |
| DE | 37 26 031 | 2/1988 |
| DE | 37 22 114 | 8/1988 |
| DE | 41 35 216 | 4/1993 |
| DE | 295 18 173 | 2/1996 |
| DE | 197 29 900 | 10/1998 |

*Primary Examiner*—Xuan Lan Nguyen
(74) *Attorney, Agent, or Firm*—Lowe Hauptman & Berner, LLP

(57) ABSTRACT

A one way braking device has a first sealed chamber filled with a viscous fluid, a braking rotor being rotably supported within the chamber, a housing or the braking rotor, respectively, coacting with a pinion which in turn cooperates with a tooth rod or a gear or the like. The first housing is floatingly supported in a second chamber of a second housing. The circumference of the first housing and a locking portion of the wall of the second chamber are formed such that a positive interengagement between the first and second housings takes place if by a linear first force component the first housing and the locking portion are moved against each other. A free running between the first and second housings is effected when a second force component opposite to the first component effects between the first and second housings.

20 Claims, 2 Drawing Sheets

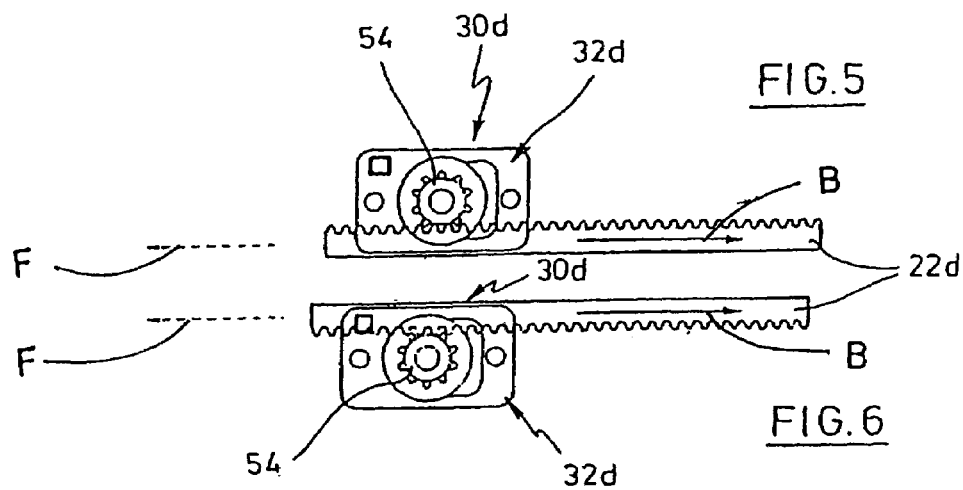
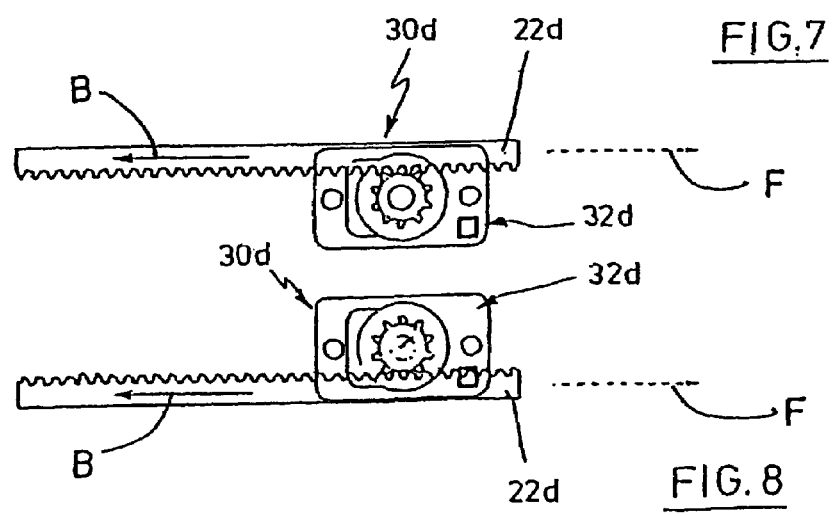

ONE-WAY BRAKING DEVICE

The referenced application is a continuation application of U.S. patent application Ser. No. 10/383,610, filed Mar. 10, 2003, now abandoned.

FIELD OF THE INVENTION

The invention relates to a one-way braking device, more particularly, to rotary attenuators.

BACKGROUND OF THE INVENTION

Rotary attenuators usually have a braking rotor which is rotatably supported in a housing. There is a viscous fluid in the housing, e.g. silicone oil. When the rotor rotates a respective resistance is produced which makes itself felt as a braking torque. An interaction with a toothed rod or toothed segment which is mounted on the component to be braked becomes possible via a shaft led out of the housing. The shaft has mostly seated thereon a pinion. Such rotary attenuators exist in most varied embodiments. They are employed, above all, in automobiles, electronic devices and the like. They have relatively small dimensions.

Unless particular provisions are made the braking action of such rotary brakes is symmetric. The braking torque obtained in either sense of rotation is approximately the same. However, a one-sided braking effect is desirable in some applications so that freewheeling is intended to act in the inverse direction. Known freewheeling systems require a wrap spring, a bipartite axle as well as an extra metallic bushing with a lubrication to transmit forces. The wrap spring cannot be mounted by automatic machines so that mounting one-way rotary attenuators of this type involves relatively great expenditure.

SUMMARY OF THE INVENTION

It is the object of the invention to improve a braking device of the aforementioned type in such a way that this reduces the mounting expenditure and allows to realize a small size of construction.

In the inventive braking device, the freewheel is formed between the housing of the rotary braking device and another housing which receives the first housing. The first housing is floatingly received in the chamber of the second housing and the circumference of the first housing and a portion of the wall of the second chamber are formed such that a positive interengagement takes place between these portions if they are moved against each other because of a linear force component acting between these portions. In such a case, a force acting on the pinion of the braking device is braked by means of the braking rotor. On the contrary, if the first and second housings are acted on in a way that they get under a force opposed to the first force component the first housing can freely rotate in the second chamber of the second housing. Freewheeling is established for this case. The positive interengagement between the first and second housings allows to transmit a large torque. In contrast, the torque is approximately zero in the freewheel direction.

According to an aspect of the invention, a circumference of the first housing has a toothing and the second chamber has a toothed segment, the toothing and the toothed segment getting in engagement with each other in a braking operation and getting out of engagement in a freewheeling operation.

According to another aspect of the invention, the locking portion is defined by spaced locking edges which cooperate with the preferably cup-shaped or grooveshaped recesses at the circular circumference of the first casing.

According to another aspect of the invention, the circumference of the first housing is a polygon in section and the locking portion is shaped as a complementary polygonal portion. A positive interengagement is obtained also here when the first and second housings are pulled towards each other in such a way that the first housing gets into engagement with the locking portion of the second housing.

Since the attenuator of the invention is symmetric freewheeling may be obtained in either direction in different mounting situations. Thus, a braking device is provided which is independent on the direction in which a braking torque or freewheeling is to be produced. Thus, only one series of tools needs to be manufactured to produce the parts of the inventive braking device. All of the parts of the inventive braking device are preferably made of a plastic material preferably by molding.

Another advantage is that the assembly of the braking device may be fully automatic. This makes unnecessary any manual preassembly as has been required for former one-way rotary brakes.

The size of construction of the inventive braking device is random and, in particular, may be built to be very small.

The material for the braking rotor and casing may be the same and preferably is a plastic. This also reduces the expenditure for the inventive braking device.

BRIEF DESCRIPTION OF THE DRAWINGS

The invention will now be described in more detail with reference to embodiments.

FIGS. 5–8 show the braking device of FIG. 4 at different stages of assembly.

DETAILED DESCRIPTION OF THE INVENTION

Figures 1, 2:
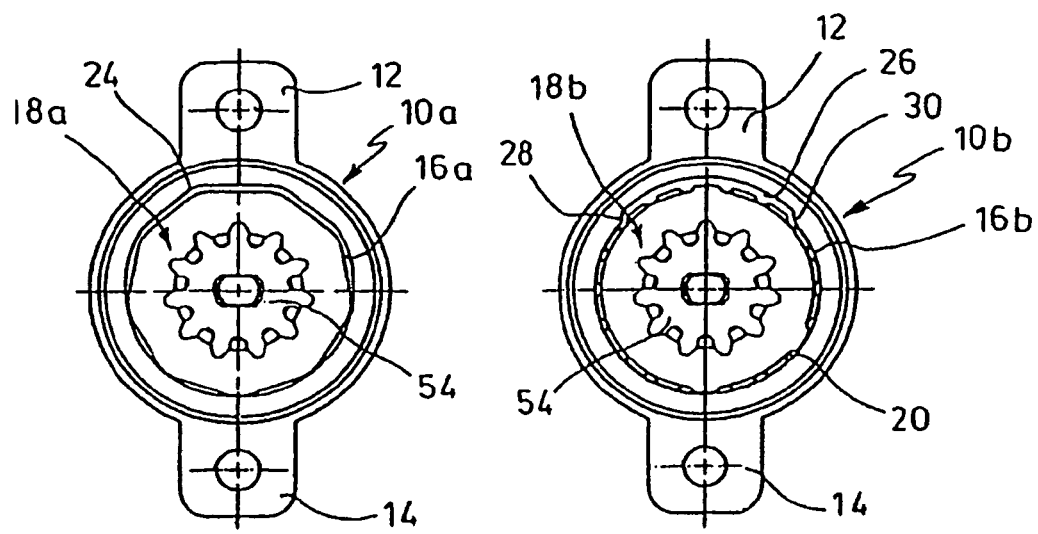
FIG. 1 schematically shows a first embodiment of a braking device according to the invention.
FIG. 2 schematically shows a second embodiment of a braking device according to the invention.
Figure 3:
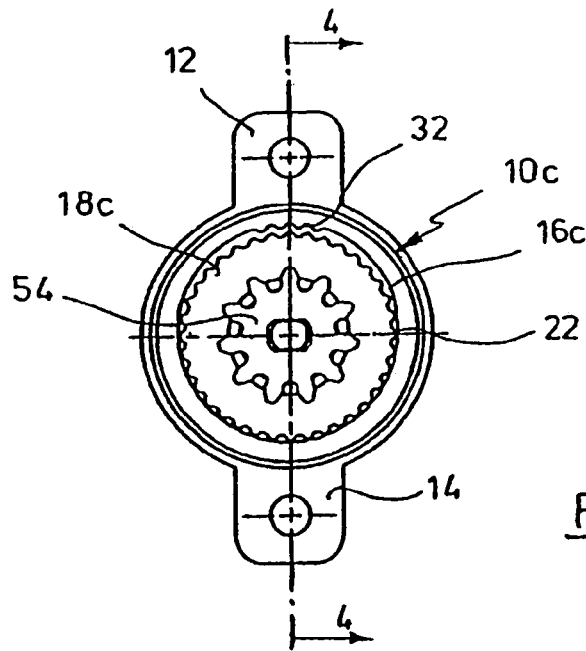
FIG. 3 Schematically shows a third embodiment of a braking device according to the invention.

FIGS. 1 through 3 schematically show three rotary attenuators which respectively have a housing 10a, 10b, 10c with diametrically opposed flanges 12, 14 to be fixed to a substrate. The housings 10a through 10c respectively have an internal chamber 16a, 16b, 16c. The chamber respectively has disposed therein a second housing 18a, 18b, 18c.

The outer circumference of the housing 18a is configured as a polygon. The outer circumference of the housing 18b is circular and is formed with groove-shaped indentations 20 at the circumference. The circumference of the housing 18c is circular and is provided with a toothing 22. It can be seen that the wall of the chamber 16a is formed with a complementary polygon of the housing 18a over a certain area at 24. In FIG. 2, in the area of the upper flange 12, the chamber 16b has an extension 26 by which two locking edges 28 and 30 are defined at the ends of the extension 26, as viewed in a circumferential direction. In the embodiment of FIG. 3, the wall of the chamber 16c has a toothed portion 32.

Figure 4:
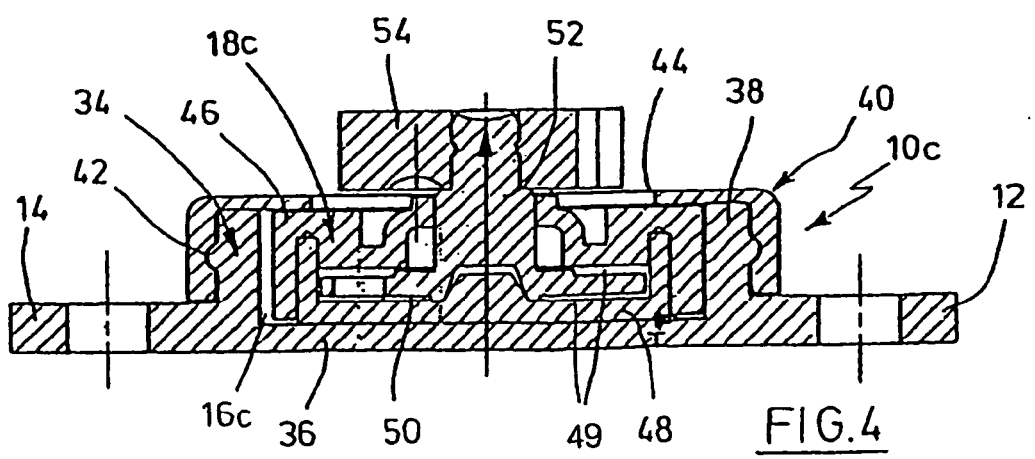
FIG. 4 shows a section through the representation of FIG. 3 along line 4—4.

The internal structure of the rotary attenuators illustrated in FIGS. 1 through 3 is apparent from FIG. 4. FIG. 4 is intended to be a section through the representation of FIG. 3, but could also represent a section through FIGS. 1 and 2.

The flange portions 12, 14 form part of a component 34 of the housing 10c which has a lower plate 36 and an annular portion 38. Plate 36 and annular portion 38 define the chamber 16c. The annular portion 38 has put thereon a cap 40 which forms a snapping connection along with the outer side of the annular portion as can be seen at 42. The top wall of the cap 40 has a central aperture 44.

The housing 18c has a first portion 46 and a second portion 48 which are introduced into each other and are appropriately connected to each other. The housing 18c has formed therein a chamber 49 which accommodates a braking rotor 50 which is rotatably and sealedly supported by a shaft butt end 52 in the housing portion 46. The shaft butt end 52 extends to the outside of the housing 10c through an opening 44 and the outer portion of the shaft butt end 52 has seated thereon a pinion 54. While the braking rotor 50 rotates relative to the housing 18c in the chamber 48 a braking action appears if the chamber 38 is filled with a viscous liquid, e.g. silicone oil. This action is generally known for rotary attenuators up to this point. The whole rotary attenuator can be molded of plastic material.

It is evident from FIGS. 1 through 3 that a positive interengagement can be established, for instance, between the housings 10a and 18a in FIG. 1 and prevents a relative rotation between the housings when the housing 18a is moved towards portion 24. In this case, a torque applied to the pinion 54 is braked in a known manner. On the contrary, if the housing 18a is moved to the opposite direction a free rotation may occur between housings 10a and 18a, which results in freewheeling if a torque is applied to the pinion 54.

The rotary attenuator of FIG. 2 reacts similarly. In this case, the positive interengagement is established with the indentations 20 by the locking edges 28 and 30. In the embodiment of FIG. 3, the positive interengagement is established between the toothing 22 of the housing 18c and the toothed portion 32 of the housing 10c.

The effect described presupposes that, apart from a torque applied to the pinion, a linear force component will act on the housing I 8a to 1 8c which either establishes or eliminates the positive interengagement described. This is the case, for instance, if a toothed rod engages the pinion 54 as is described in the context of FIGS. 5 through 8. It further presupposes that the housing 18a, 18b, and 18c is floatingly received each in the chamber 16a, 16b, and 16c of the housing 10a, 10b, 10c, respectively.

FIGS. 5 through 8 illustrate the rotary brake 30d in a way approximately similar to that of FIG. 2 in different positions. In FIG. 5, a toothed rod 22d is disposed below a pinion 54 and a braking effect will result when the toothed rod 22d moves to the right (arrow B), and a freewheeling effect will result when it moves to the left (arrow F). The housing of FIG. 6 is disposed as that of FIG. 5, but the toothed rod 22d is disposed above the pinion 54. A rightward movement of the toothed rod 22d again results in braking and a leftward movement results in freewheeling.

In the embodiment of FIGS. 7 and 8, the housing 32d is turned through 180 degree. A rightward movement of the toothed rod 22d of FIG. 7 which is disposed above results in freewheeling (arrow F) and a leftward movement results in braking (arrow B). The toothed rod 22d of FIG. 8 which is disposed below causes a freewheeling effect when moved to the right and causes braking when moved to the left.

The invention claimed is:

1. A one way braking device, comprising:
   a first housing having a first sealed chamber filled with a viscous fluid and a first locking portion on a circumference of said first housing;
   a braking rotor being rotatably supported within the first chamber;
   a pinion attached to said braking rotor and adapted to mesh with a gear; and
   a second housing having a second chamber which has a second locking portion on a wall thereof;
   wherein
   the first housing is floating in the second chamber;
   the first and second locking portions are engaged when the first housing is moved relative to the second housing in a first direction, wherein, when said first and second locking portions are engaged, rotational movement of said first housing about the rotational axis of the braking rotor and relative to said second housing is limited in both clockwise and counterclockwise directions; and
   the first and second locking portions are disengaged to allow a free running between the first and second housings when the first housing is moved relative to the second housing in a second direction opposite to the first direction, wherein, when said first and second locking portions are disengaged, said first housing is rotatable about the rotational axis of the braking rotor and relative to said second housing in both said clockwise and counterclockwise directions.

2. The braking device, of claim 1, wherein the first and second locking portions include matching toothed segments.

3. The braking device of claim 1, wherein the second locking portion has two spaced apart locking edges which cooperate with the first locking portion which includes spaced apart projections on said circumference of the first housing.

4. The braking device of claim 1, wherein the first locking portion on the circumference of the first housing is a polygon in cross section and the second locking portion is shaped as a complementary polygonal portion.

5. The braking device of claim 1, wherein the second chamber of the second housing is defined within an annular portion, and an open side of the annular portion is covered by a cap which overgrips the annular portion.

6. The braking device of claim 5, wherein the cap forms a snapping connection with the annular portion.

7. The braking device of claim 1, wherein the whole said device is molded of plastic material.

8. The device of claim 1, wherein the second locking portion includes first and second stop elements which, when the first and second locking portions are engaged, define limits for rotational movements of said first housing clockwise and counterclockwise, respectively.

9. The device of claim 1, wherein, when the first and second locking portions are disengaged, the first housing is free to rotate about the rotational axis, both clockwise and counterclockwise, for full 360°.

10. The device of claim 1, wherein said first housing is moveable in a straight line relative to said second housing between a braking position where the first and second locking portions are engaged and a free running position where the first and second locking portions are disengaged.

11. A one way braking device, comprising:
    a first housing defining a first chamber containing a viscous liquid, said first housing having a first locking portion;

a braking rotor rotatably received in said first chamber;

a second housing defining a second chamber, said second chamber having a second locking portion engageable with the first locking portion, said first housing being retained in the second housing so as to be moveable relative to said second housing in at least two different straight axes located in a plane perpendicular to a rotational shaft of said braking rotor;

wherein said first housing is moveable within said second housing between a braking position and a free running position;

in said braking position, said first and second locking portions are engaged, whereby rotational movement of said rotor will be braked by the viscous liquid; and in said free running position, said first and second locking portions are disengaged, whereby rotational movement of said rotor will cause a free running between the first and second housings.

12. The braking device of claim 11, wherein an outer wall of the first housing has, in cross section, a convex polygonal portion as said first locking portion; and an inner wall of said second chamber consists of, in cross section, (1) a single complementary convex polygonal portion as said second locking portion and (2) a circular portion.

13. The braking device of claim 12, wherein an entirety of the outer wall of the first housing is, in cross section, a single convex polygon.

14. The braking device of claim 11, wherein an entirety of an outer wall of the first housing is, in cross section, a single convex polygon; and the second chamber has an inner wall which is, in cross section, at least partially polygonal and complementary to the convex polygon of said first housing.

15. The device of claim 11, further comprising a pinion attached to the rotational shaft of said braking rotor for transmitting an external rotational force to said braking rotor.

16. The device of claim 15, further comprising a toothed rod meshing with said pinion.

17. The braking device of claim 11, wherein the second locking portion is a recess on an inner wall of said second chamber;

the first locking portion includes multiple projections on an outer wall of the first housing; and in the braking position, said multiple projections are received in said recess.

18. A one way braking device, comprising:

a first housing defining a first chamber containing a viscous liquid, said first housing having an outer wall which includes a first locking portion;

a braking rotor rotatably received in said first chamber;

a second housing defining a second chamber, said second chamber having an inner wall which includes a second locking portion engageable with the first locking portion, said first housing being moveable within said second housing between a braking position and a free running position;

wherein in said braking position, said first and second locking portions are engaged, whereby rotational movement of said rotor will be braked by the viscous liquid;

in said free running position, said first and second locking portions are disengaged, whereby rotational movement of said rotor will cause a free running between the first and second housings; and said first housing is moveable relative to said second housing in a plane perpendicular to a rotational shaft of said braking rotor, and limits to movements of said first housing within said second housing in said plane are defined solely by sizes and shapes of cross sections of said inner and outer walls taken in said plane.

19. The device of claim 18, wherein said first housing is moveable relative to said second housing in at least two different straight axes located in said plane.

20. A one way braking device, comprising:

a first housing defining a first chamber containing a fluid, said first housing having a first locking portion;

a second housing defining a second chamber, said second chamber receiving said first housing and having a second locking portion engageable with the first locking portion;

a braking rotor rotatably received in said first chamber;

wherein said first housing is moveable in translational motion relative to said second housing between a braking position and a released position;

in said braking position, said first and second locking portions are engaged, whereby rotational movement of said rotor will be braked by the fluid; and in said released position, said first and second locking portions are disengaged.

* * * * *